United States Patent [19]
Diemer

[11] Patent Number: 6,161,961
[45] Date of Patent: *Dec. 19, 2000

[54] BUSH FOR NEEDLE BEARINGS

[75] Inventor: Karl Diemer, Idstein, Germany

[73] Assignee: The Torrington Company, Torrington, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/065,889

[22] Filed: Apr. 24, 1998

[30]      Foreign Application Priority Data

Apr. 25, 1997  [DE]  Germany ............................ 197 17 598
Feb. 23, 1998  [DE]  Germany ............................ 198 07 552

[51] Int. Cl.$^7$ .................................................. F16C 21/00
[52] U.S. Cl. ........................................ 384/127; 384/420
[58] Field of Search ................................. 384/127, 126, 384/123, 305, 368, 371, 420, 245; 464/128, 132, 112

[56]                  References Cited
U.S. PATENT DOCUMENTS 4,154,065   5/1979  Diffenderfer .
4,772,188   9/1988  Kimura et al. ........................... 384/123
4,861,315   8/1989  Mazziotti .
5,277,499   1/1994  Kameyama ............................. 384/123
5,695,405  12/1997  Kono ...................................... 464/128

FOREIGN PATENT DOCUMENTS 2489906   3/1982  France .
6810086  12/1968  Germany .
7035694   7/1972  Germany .
9007248   6/1990  Germany .

*Primary Examiner*—David A. Bucci
*Assistant Examiner*—Colby Hansen
*Attorney, Agent, or Firm*—John C. Bigler

[57]                   ABSTRACT

A cup for needle bearings, having depressions or ramps arranged on the cup bottom for receiving lubricant, the ramps starting in a star shape from the middle of the cup bottom and being configured with a depth which decreases radially outwardly. At the middle of the cup bottom there is a central elevation with a rounded end face for the thrust of an end face of a shaft. The axial thrust behavior between these parts is thus optimized.

7 Claims, 2 Drawing Sheets

BUSH FOR NEEDLE BEARINGS

BACKGROUND OF THE INVENTION

This invention relates generally to a cup for needle bearings and, more particularly, to a cup configuration enhancing lubrication of the needle rollers.

The movement of a shaft running in a needle bearing cup can be limited in the axial direction by the inner side of the bottom of the needle cup. The same applies to a needle cup when it is arranged projecting on one end of the shaft in the manner of a running or supporting roll or as a substitute for a connecting rod.

Previously, needle cups have been known with thrust disks arranged on the inner side of the cup bottom which are provided with lubricating grooves to receive lubricant (DE-G 90 07 248.0-U1). Needle cups with depressions, in particular waffle-like depressions, on the inner side of the cup bottom are also known (FR-PS 2 489 906). In all these cases, there is indeed a lubricating effect between the cup bottom and the end of the shaft. However, the axial thrust behavior between the end face of the shaft and the cup bottom has previously not been given further consideration.

The foregoing illustrates limitations known to exist in present devices and methods. Thus, it is apparent that it would be advantageous to provide an alternative directed to optimizing the axial thrust behavior of the end face of the shaft in relation to the cup bottom as well as other limitations set forth above. Accordingly, a suitable alternative is provided including features more fully disclosed hereinafter.

SUMMARY OF THE INVENTION

In one aspect of the invention, this is accomplished by providing a cup for needle bearings comprising a cup bottom having depressions arranged for receiving lubricant, wherein the depressions are configured as ramps, starting in a star shape from the middle of the cup bottom and having a depth which decreases radially toward the outside.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1A:
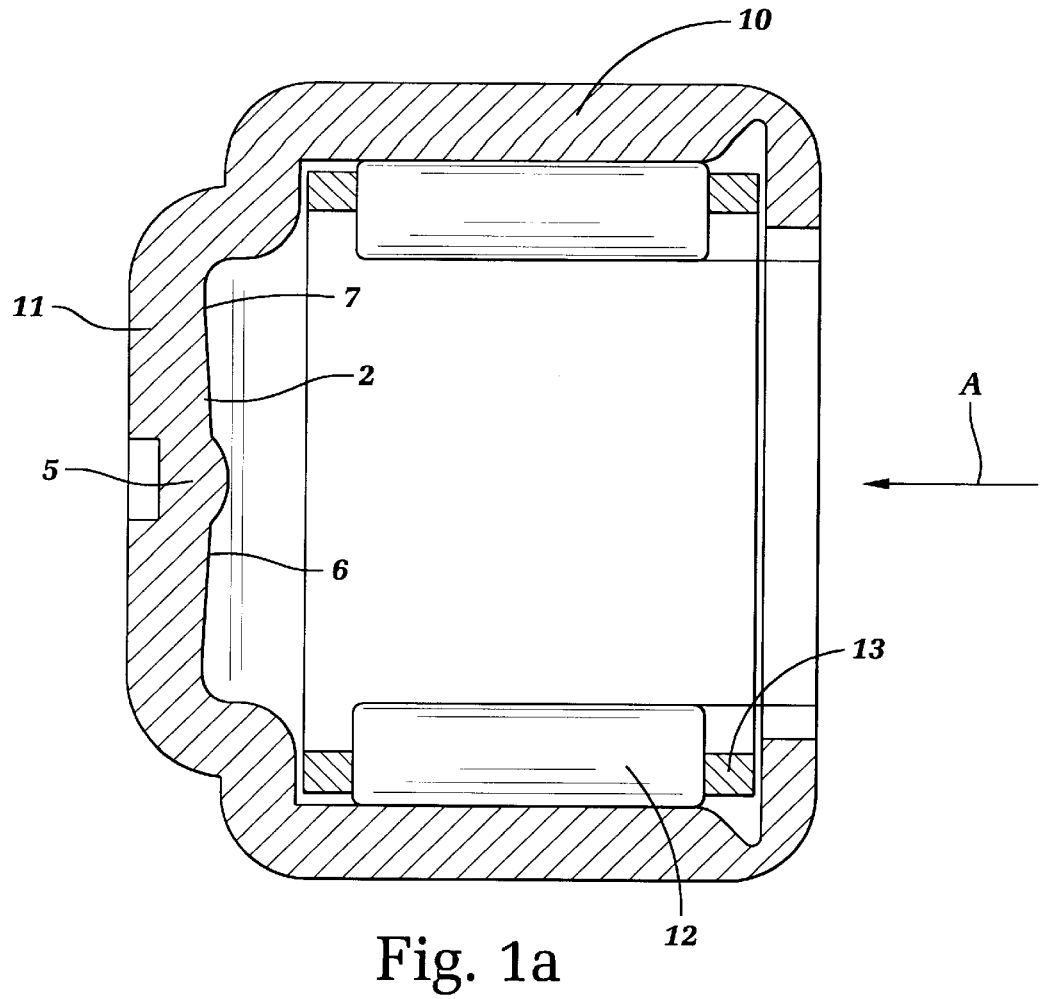
FIG. 1a is a cross-sectional view illustrating a first embodiment of a needle cup according to the invention.
Figure 2A:
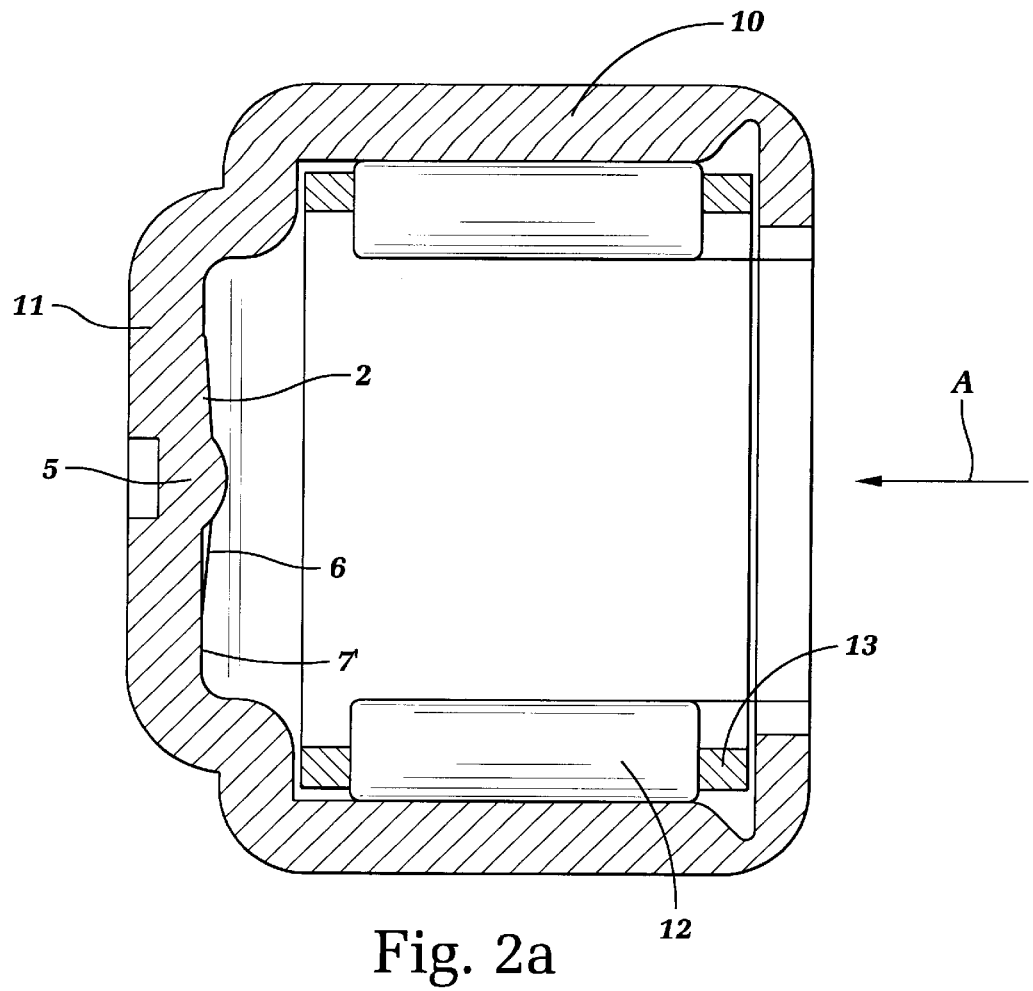
FIG. 2a is a cross-sectional view illustrating another embodiment of a needle cup according to the invention.

Referring now to the drawings, FIGS. 1a and 2a illustrate a needle cup 10 with a cup bottom 11 which is fitted with needle rollers 12 which are retained in a needle cage 13.

Formed on the cup bottom 11 of the needle cup 10 of FIG. 1a are depressions in the form of ramps 2 (FIG. 1b), which depressions go out concentrically from the middle and whose depth 6 decreases radially from the inside to the outside (FIG. 1a). The ramps 2 have approximately the profile of conical segments whose base lies near to the middle of the cup bottom 11 and which have tips 7 at their radially outer ends. The recesses or intervals between the ramps 2 of star-shaped configuration (according to FIG. 1b six such ramps 2 may be provided) serve to receive lubricant.

The ramps 2 extend from a central elevation 5 with a rounded end face on the cup bottom 11. The central elevation 5 projects further toward the inside of the cup 10 in relation to the central beginning of the ramps 2. Preferably, the central elevation 5 has the shape of a spherical segment. The central elevation 5 and the ramps 2 are stamped or pressed out from the cup bottom 11.

Compared to previously known configurations of the cup bottom 11 or of additional disks which are inserted against the cup bottom, which in each case constitute a thrust surface in relation to an end face of a shaft which is flat in the radial direction, in the configuration according to the invention, a spot-like contact first occurs between the flat end face of the shaft and the highest point of the rounded central elevation 5. As a result, a hydrodynamic lubrication film forms between the ramps 2 and the end face of the shaft. The end face of the shaft first contacts the rounded end face of the central elevation 5 only at a point. In the case of possible wear of the elevation 5, by virtue of the design of the ramps 2 with a depth which decreases toward the outside, a minimum thrust surface area is provided between the cup bottom 11 and the end face of the shaft, or an increase in the friction radius having only a delayed effect even if the hydrodynamic lubrication were to fail or become less effective.

Figure 1B:
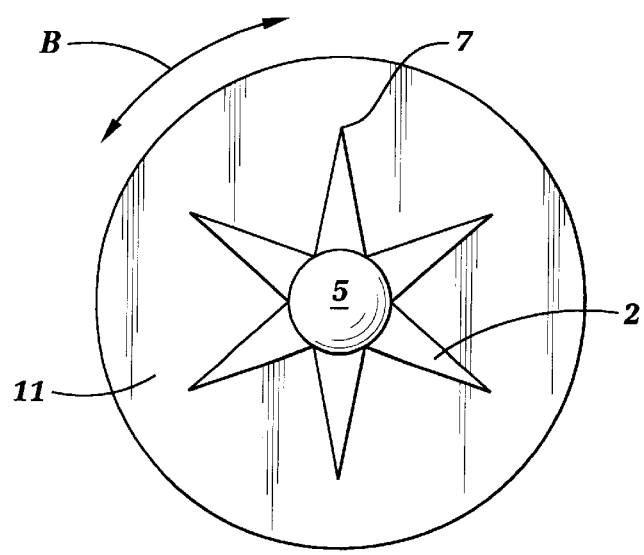
FIG. 1b is a front view of the cup bottom of the needle cup of FIG. 1a, in the direction of arrow A.

The configuration of the cup bottom 11 with the ramps 2 according to FIGS. 1a and 1b permits rotation of the shaft (not illustrated) in relation to the needle cup 10 in both directions of rotation according to the arrow B in FIG. 1b.

Figure 2B:
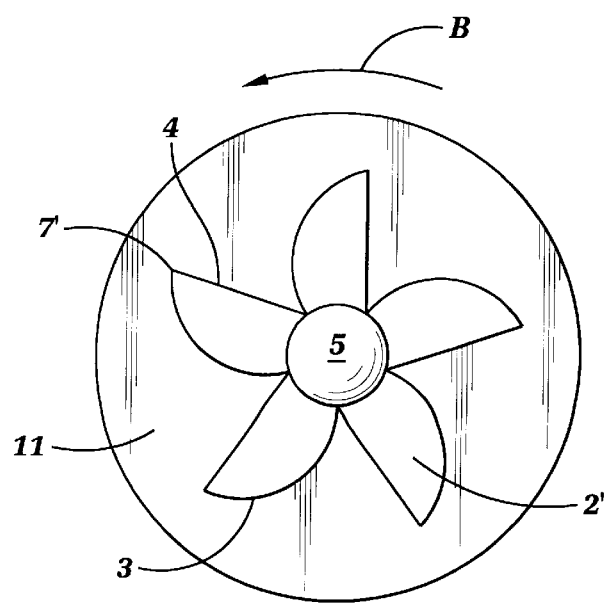
FIG. 2b is a front view of the cup bottom of the needle cup of FIG. 2a, in the direction of arrow A.

In the modified exemplary embodiment according to FIGS. 2a and 2b, the same parts are denoted by the same reference numerals as in the example according to FIGS 1a and 1b. The ramps 2' are configured as hollow profiles in the manner of propellers in a star shape with tips 7' pointing approximately radially outward. Five such ramps 2', for example, are provided. Here too, the depth 6 of the ramps 2' decreases starting from the central elevation 5 radially outward up to the tips 7'. However, the ramps 2' have curved or bent side edges 3 and approximately straight and nearly radial side edges 4. The curved or bent side edges 3 project axially further from the bottom 11 of the cup 10 than the straight side edges 4, so that there is a rise in the ramps 2', starting from the cup bottom 11, from the straight edges 4 to the curved or bent edges 3. This configuration of the cup bottom 11 results in the shaft (not illustrated) being rotatable in relation to the needle cup 10 in only one direction of rotation which is indicated by the arrow B in FIG. 2b. In this case, the straight side edges 4 form, viewed in the direction of rotation of the shaft, the beginning of the ramp located at a lower level, and the curved or bent side edges 3 form the end of the ramps 2' located at a higher level.

The functioning of the embodiment according to FIGS. 2a and 2b corresponds essentially to the functioning according to FIGS. 1a and 1b. According to FIGS. 2a and 2b, however, the hydrodynamic lubrication film has a better and clearly pronounced wedge shape owing to the rise in the ramps 2' between their edges 4 and 3.

Instead of being provided on the inner side of the cup bottom 11, the ramps 2 or 2' and the central elevation 5 can also be provided on its outer side if, for example, the outer side of the cup bottom 11 serves as a thrust surface.

The bearing cup in accordance with the invention can be used as a substitute connecting rod (e.g. in pumps) without additional surrounding or supporting components, because through the design of ramps 2, 2' on the cup bottom 11 the torque is hydrodynamically minimized. An additional advantage is that a lifetime lubrication of the bearing cup is possible through the one-time filling of lubricating grease for the roller set or needle set 12 and for the cup bottom 11.

From the above description, it will be apparent that the depressions on the cup bottom, which are configured as star-shaped ramps, with a depth which decreases toward the outside radially provide a minimum defined contact surface, which are inexpensive to manufacture, between the end face of the shaft and the cup bottom, it being possible for the smallest possible friction radius to be realized. Using the wedge splitting principle, the friction between the end face of the shaft and the cup bottom is reduced hydrodynamically. By virtue of the ramp shape of the depressions of this configuration, a defined axial thrust of the end face of the shaft on the cup bottom thus results. This is particularly important if the needle cup is subjected to exceptionally high loading due to a specific load application from the outside in the axial direction.

In the configuration according to patent claim 2, an especially good reduction of the friction between the cup bottom and the end face of the shaft results due to a central rounded end face on the cup bottom, so that the depressions of the ramps serve as a lubricant storage space, and the ramps increasingly come into frictional engagement with the end face of the shaft only when the central elevation on the cup bottom is worn. Until then, a continuously decreasing incline height forms a wedge space for the lubricant necessary for the formation of the separating film.

Having described the invention, what is claimed is:

1. A cup for needle bearings comprising:

a cup with elevations extending from a cup bottom, wherein an area between the cup bottom and the elevations forms a free space to hold lubricants, the elevations being formed, star shaped, extending from the middle of the cup bottom with a height declining radially outwardly, the height of the elevations declining in at least one circumferential direction to form ramps.

2. The cup as claimed in claim 1, wherein the ramps start from a central elevation with a rounded end face on the cup bottom.

3. The cup as claimed in claim 2, wherein the central elevation projects further in relation to the central beginning of the ramps.

4. The cup as claimed in claim 2, wherein the central elevation has a spherical shape.

5. The cup as claimed in claim 1, wherein the elevations are configured as profiles approximately in the manner of conical segments with a tip pointing radially outward such that the curved sides of the conical segments provide the ramps.

6. The cup as claimed in claims 1, wherein the elevations are configured as substantially flat surfaces contacting the cup bottom at one side edge, the substantially flat surfaces being angled upward from the cup bottom to provide ramps in only one circumferential direction, the elevations having an opposite side edge that is curved.

7. The cup as claimed in claim 2, wherein at least a portion of the ramps and the central elevation is formed by impressing the bottom of the cup.

* * * * *